United States Patent [19]

Franchina

[11] 4,343,296
[45] Aug. 10, 1982

[54] SOLAR HEATING SYSTEM
[75] Inventor: Antonino Franchina, Sterling Heights, Mich.
[73] Assignee: Karl Wojcik, Warren, Mich.; a part interest
[21] Appl. No.: 215,380
[22] Filed: Dec. 11, 1980

Related U.S. Application Data
[63] Continuation-in-part of Ser. No. 84,880, Oct. 15, 1979, Pat. No. 4,291,833.

[51] Int. Cl.³ ............................................. F24J 3/02
[52] U.S. Cl. ................................. 126/436; 126/427; 126/430; 126/440; 165/110
[58] Field of Search ............... 126/436, 440, 449, 430, 126/429, 400; 252/70; 165/110

[56] References Cited
U.S. PATENT DOCUMENTS

| | | | |
|---|---|---|---|
| 3,720,198 | 3/1973 | Laing et al. | 219/341 |
| 4,071,016 | 1/1978 | Henderson | 126/440 |
| 4,137,898 | 2/1979 | Koizumi | 126/430 |
| 4,190,199 | 2/1980 | Cawley | 126/427 |

Primary Examiner—Carroll B. Dority, Jr.
Assistant Examiner—Anderson G.
Attorney, Agent, or Firm—Basile, Weintraub & Hanlon

[57] ABSTRACT

A solar heating system for providing heat to a building is disclosed as having a plurality of solar panels for collecting heat. The solar panels have a transparent panel through which the sun rays pass for heating the interior of the panel and the air within that panel. Additionally, the transparent panels include concentrating lenses for heating a heat exchanger disposed within the panel whereby additional heat is provided to heat the air within the solar panel. Heat generated through the solar panel is stored in Zeolite crystals in a heat storage chamber which is utilized to provide heat for the building. The Zeolite crystals function as a sponge-like substance which has the property to store 750,000 BTU per cubic yard for an indefinite time. A heat pump is provided to supplement the solar heat when the temperature in the heat storage chamber is below a comfortable level. During heat pump operation solar warmed air is pumped from the heat storage chamber to the chamber surrounding the heat pump evaporator to raise the evaporator ambient temperature and provide more efficient heat pump operation.

3 Claims, 2 Drawing Figures

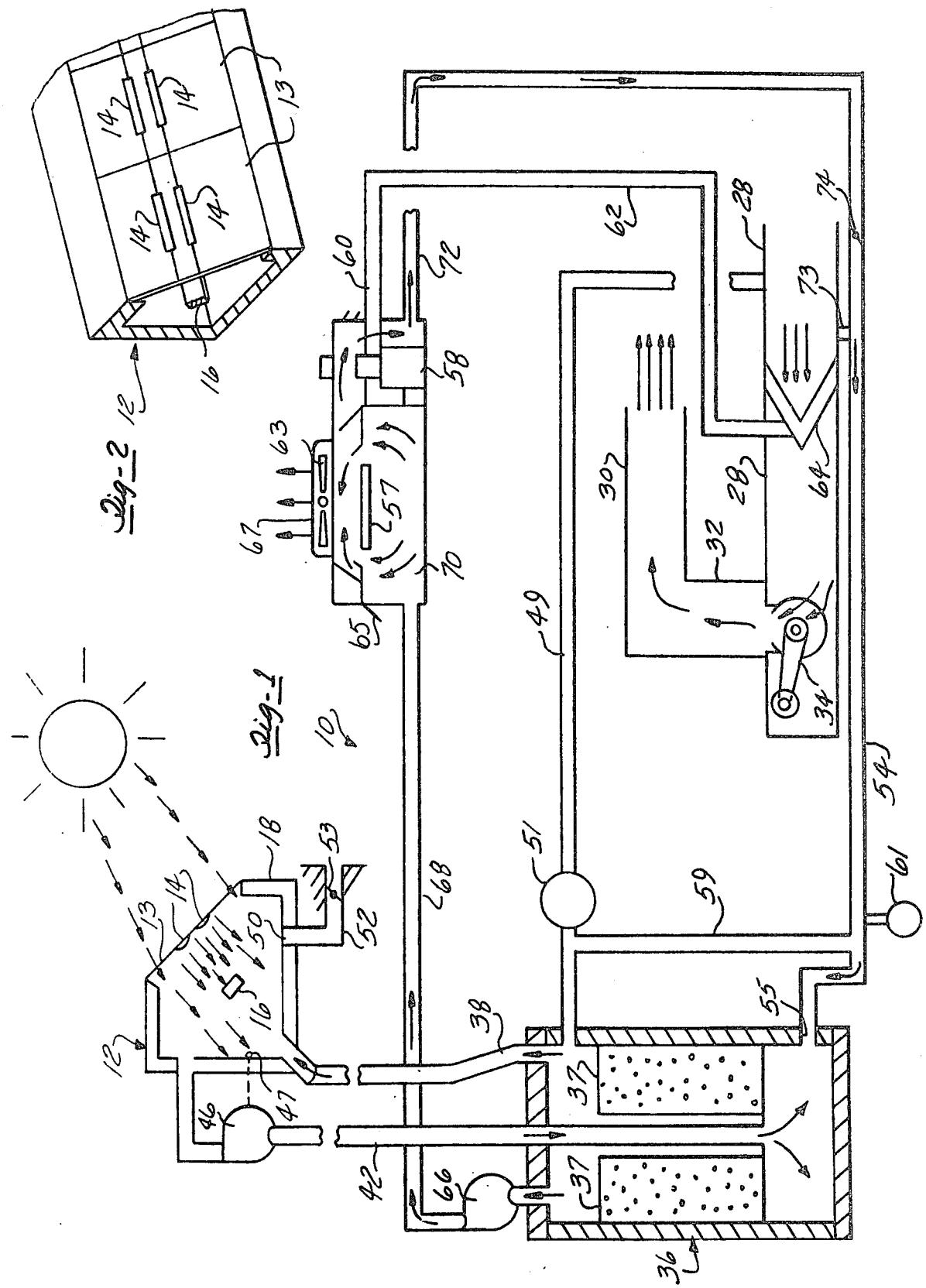

SOLAR HEATING SYSTEM

CROSS REFERENCE TO RELATED APPLICATIONS

The present invention relates to U.S. Pat. No. 4,141,490 issued on Feb. 27, 1979, for a HEATING SYSTEM; U.S. Pat. No. 4,202,493 issued May 13, 1980, for a HEATING SYSTEM HAVING SOLAR ASSIST; and is a continuation-in-part application of co-pending U.S. patent application Ser. No. 84,880 filed Oct. 15, 1979, now U.S. Pat. No. 4,291,833, for a HEATING SYSTEM WITH FOCUSED SOLAR PANELS AND HEAT PUMP ASSIST.

BACKGROUND OF THE INVENTION

1. Field of the Invention

The present invention relates to solar heating systems for heating a building and, in particular, the present invention relates to a solar heating system having solar panels with light concentrating lenses for concentrating the sunlight on solar collectors in the form of a heat exchanger within the panel.

2. Description of the Prior Art

In recent years there has been a concern for the high cost of energy and, in particular, for the high cost of providing heat to homes, office buildings and the like. It is well known that the sun may provide heat for heating such buildings and it is not uncommon for solar panels to be used which convert the sun's rays into heat and wherein the heat is then utilized for the heating of the building. Examples of the most relevant prior art known to applicant are those cited in the prosecution of the aforementioned U.S. patent application Ser. No. 84,880. This prior art includes U.S. Pat. Nos. 4,188,941 issued Feb. 19, 1980; 4,196,719 issued Apr. 8, 1980; 4,066,118 issued Jan. 3, 1978; and Document No. 0002374 dated Dec. 12, 1979, constituting a European patent application.

U.S. Pat. No. 4,188,941 discloses a solar heating system including an insulated tank containing a fluid heat transfer medium. Apertures are formed in the tank cover with lenses located above each aperture so as to focus the solar energy to the tank. The unit is mounted on bearings and is rotatable or oscillated to track with the sun.

In U.S. Pat. No. 4,196,719 a solar collector is disclosed which is stationarily positioned, but it is evident that as the sun moves across the sky, less and less amounts of solar energy will strike the collector and be absorbed by the heat transfer medium.

In the Exxon European Patent Application Document No. 0002374, a plurality of cylindrical lenses are disposed on one side of a conductor through which passes a heat collecting fluid with a plurality of substantially parallel concave reflectors disposed on the other side of the conduits. The arrangement of the lenses and reflectors are such that radiation falling on the lenses is concentrated on the exterior surface of the conduit section by the lenses directly from the lenses and/or indirectly after reflection from the reflectors.

These structures differ from applicant's claimed invention.

SUMMARY OF THE INVENTION

The present invention, which will be described subsequently in greater detail, comprises a heating system for heating homes, office buildings and the like comprising a solar panel which warms air contained therein. Warm air is circulated to an air circulator which replaces a conventional furnace. The solar panel utilized for converting the sun energy into heat comprises an enclosed chamber having a transparent panel portion through which the sun's rays pass to heat the interior of the solar panel and thus the air therein. Additionally, the solar panels have a plurality of sunlight concentrating lenses which focus the sun rays onto a heat exchanger mounted within the solar panel, and the heat exchanger heats the air within the solar panel. When the temperature within the solar panel reaches a predetermined amount, a sensor operates a fan which will communicate the heated air within the solar panel to Zeolite crystal blocks which will store the heat for future use. A heat pump is provided to supplement the solar heat when the temperature in the heat storage chamber which stores the Zeolite crystal blocks is below a comfortable level. During heat pump operation solar warmed air is also pumped from the heat storage chamber to an area surrounding the heat pump evaporator to raise the evaporator ambient temperature and provide more efficient heat pump operation.

It is therefore a primary objection of the present invention to provide a new and improved heating system for buildings.

It is a further object of the present invention to provide a heating system which combines a solar heater and a heat pump to provide for more efficient heating and cooling of the air within a building.

It is another object of the present invention to provide a solar panel that employs lenses that concentrate the sun's solar energy to raise the temperature of the solar panel collector so as to improve the solar panel efficiency.

It is yet another object of the present invention to provide a heat storage chamber which is insulated and functions to store heat during periods when there is more solar energy available than is needed, but which will function to give up the stored heat during periods of low solar heat availability.

Further objects, advantages and applications of the present invention will become apparent to those skilled in the art of heating systems utilizing solar panels when the accompanying description of one example of the best mode contemplated for practicing the invention is read in conjunction with the accompanying drawing.

BRIEF DESCRIPTION OF THE DRAWING

The accompanying description refers to the drawing wherein like reference numerals refer to like parts throughout the several views, and wherein:

FIG. 1 is a schematic diagram of a heating system constructed in accordance with the principles of the present invention; and FIG. 2 is a perspective, partially sectioned schematic view of a solar panel utilized in the inventive heating system.

DESCRIPTION OF THE PREFERRED EMBODIMENT

A detailed description of the invention may be had by reference to the accompanying drawing wherein, in FIG. 1, there is illustrated a heating system 10 for heating a building. The system 10 includes a solar collector 12 which includes a plurality of solar panels 13 each having lenses 14 for concentrating and focusing solar energy on a heat exchanger 16, which is configured to absorb heat from the concentrated solar rays. The lenses 14 are formed at the mid-section of each of the conventional solar panels 13, and the panels 13 are, in turn, supported by an insulated enclosure 18 which contains air warmed by the heat radiating from the heat exchanger 16 and the walls of the enclosure 18. The walls of the enclosure 18 are heated by the sun rays which pass through that portion of the panels 13 not occupied by the lenses 14.

As can best be seen in FIG. 2, the heat exchanger 16 of the solar collector 12 is sufficiently longer than the plurality of lenses 14 so that sunlight passing through the lenses will always be concentrated on at least some portion of the heat exchanger 16 as the sun moves across the sky during the day.

The heating system 10 further comprises an air return duct 28 through which air from within the building is returned for heating. The system 10 also has a conditioned air duct 30 from which the heated air is returned to the building. The system 10 includes an air circulator 32 having a fan 34 which is adapted to drive air from the return duct 28 to the outlet duct 30. The air passing through the air circulator 32 is heated by using heat from the solar collector 12.

The system 10 further includes an insulated heat storage chamber 36 which receives solar warmed air from the collector 12 and contains Zeolite crystal blocks 37, which absorb heat from the solar warmed air when being heated, and which gives up its heat when moist air is allowed to pass over the block 37. Zeolite crystals have a latticed matrix structure which is formed around a cluster of water molecules. When heat is applied, the binding force in the lattice is overcome and the water molecules are driven off, leaving a large pore. The Zeolite crystals function as a sponge-like substance which has the property to store 750,000 BTU per cubic yard. The crystals can indefinitely store heat during summer months for use in winter months.

The energy it takes to do this is stored as potential energy.

When the Zeolite crystal cools, it wants to reverse the process by reabsorbing the lost water and releasing energy; but if it is cut off from a source of moisture, this reversal cannot take place and the energy remains stored. To release the energy, moist air is allowed into the system and heat is generated.

Since humidity, not temperature, controls the reversal, a charged Zeolite bed does not need to be maintained at any particular temperature. A cubic yard of Zeolite, a clay-like mineral used as an ion-transfer medium in water softeners, will store 750,000 BTU, making the substance a heat-holding material that is 455 times as efficient as water and 1,428 times as efficient as stone.

The storage chamber 36 has a conduit 38 that connects the storage chamber 36 with the solar collector 12 and a second conduit 42 which connects the solar collector 12 to the storage chamber 36. A fan 46 disposed in the conduit 42 translates air from the solar collector 12 to the storage chamber 36, while the drop in pressure created by the withdrawal of air from the solar collector 12 will draw air from the storage chamber 36 via the conduit 38. It should be noted that the solar collector enclosure 18 is provided with an opening 50 connecting to a conduit 52 that opens externally of the building. The conduit 52 has a damper 53 such that, when the damper is opened due to the suction effect created by the fan 46 within the solar collector 12, air is drawn in from the outside, which air is adapted to be heated and transmitted to the storage block 37 via the conduit 42. The fan 46 is operative only when the temperature in the collector 12 is above a predetermined amount. Temperature sensor 47 within the solar collector 12 is electrically connected to the fan 46 and operates the same when the predetermined temperature is reached.

A conduit 49 connects the insulated storage chamber 36 with the return duct 28, such that the fan 34 therein will draw heated air from the storage chamber 36 and mix the same with the return air coming from the return duct 28, whereby a mixture of heated air is translated to the conditioned air duct 30 and to the building. The conduit 49 has the same cross-sectional area as the return duct 28 and also has a suitable filter and humidifier 51 which functions to purify the air going through the conduit 49 before the air is transmitted into the building. The building has an underground drain pump 54 which communicates via inlet opening 55 with the interior of the storage chamber 36. The moisture which enters the storage chamber 36 from the underground drain pipe 54 functions to provide the moisture needed to release the energy stored in the Zeolite block 37 and thus heat the air passing therethrough which is funneled to the house via the conduit 49.

The system has a conduit 59 which connects the conduit 49 and the drain pipe 54 whereby the cool air in the drain pipe 54, which is at a constant temperature of 56° F., can be used in the summer during the air-conditioning operation of the system. Water is received from the drain pipe 54 by means of a sump pump 61 connected to drain pipe 54.

The heat storage chamber 36 is sized to absorb heat by means of the Zeolite blocks 37 contained therein on days when there is a surplus of solar energy. At night and during periods of prolonged cloudiness, the heat storage chamber 36 gives up its heat to the moist air passing therethrough from the underground drain pipe 54 to maintain a suitable temperature level in the building as the heated air is communicated to the conditioned air duct 30 via the conduit 49.

Should an excess or prolonged demand for heat reduce the temperature of the air within the heat storage chamber 36 to a point where the temperature within the conditioned air duct 30 is sufficiently low to cause discomfort within the building, a suitable sensing device starts a heat pump compressor 58 which draws fluid from a heat pump evaporator 57 adapted to absorb heat from its ambient surroundings. A fan 63 draws air from the atmosphere through an inlet 65 past the evaporator 57 whereon the air is exhausted through an outlet or vent 67. A fluid which has absorbed the heat from the evaporator 57 is compressed by the compressor 58 and transmitted via a line 60 to a condenser 64 disposed in the return air duct 28, where the fluid gives up its heat to the air passing therethrough. The fluid returns to the heat pump compressor 58 by means of a second line 62 extending between the compressor and the condenser.

When the heat pump compressor 58 is operative, suitable control means associated with the system will start in motion a fan 66 disposed in a conduit 68 which interconnects the heat storage chamber 36 and the area 70 in the evaporator 57. This conduit 68 transmits warm air from the heat storage chamber 36 and from drain pipe 54 to the area 70 raising the ambient temperature at the evaporator 57 to increase its efficiency and thus the amount of heat the evaporator 57 can absorb. A conduit 72 connects the area 70 to the drain pipe 54 and thus to the heat storage chamber 36 so as to return air to the heat storage chamber as well as permit water collected in the area 70 to be exhausted from the area 70. The drain pipe 54 is connected via a conduit 73 to the return duct 28 so that air may be channeled through the duct 73, drain pipe 54, to the heat collector 36. The underground conduit 54 also includes a damper 74 which functions to open when the heat pump is operative.

It can thus be seen that my invention utilizes solar energy and underground air to heat a building without the need of gas or electric or oil furnaces of the conventional type.

I claim:

1. A stationary solar heater having interior walls and a solar energy collector for utilizing sunlight to heat the walls and the solar energy collector whereby air is circulated past the walls and collector to absorb heat therefrom and translated to a device for utilizing the heat contained within the air, the improvement comprising:

a solar panel through which the sun rays pass for heating the interior walls of the solar heater and thus the air therein;

a plurality of lenses carried on a portion of the panel, said lenses concentrating the solar energy on the collector;

the collector having a length substantially longer than the length of the plurality of lenses;

wherein the plurality of lenses and the collector are aligned so that in the morning the entire amount of solar energy striking the lenses is concentrated directly on a first portion of said collector, at noon the entire amount of solar energy striking the lenses is concentrated directly on a second or central portion of the collector, and in the afternoon the entire amount of solar energy striking the lenses is concentrated directly on a third portion of the collector;

a heat chamber;

a plurality of Zeolite crystals in said chamber adapted to store heat communicated to said storage chamber from said solar energy collector;

means for communicating said solar energy collector to said heat storage chamber when the temperature in said solar energy collector reaches a predetermined amount; and means for communicating moist air to said heat storage chamber to release the heat stored in said Zeolite crystals.

2. The solar heater defined in claim 1 further comprising:

a heating system device for a building comprising:

a conditioned air duct for passing conditioned air;

an air return duct for passing return air;

an air circulator having an inlet communicating with said conditioned air duct and said air return duct, and a first fan for moving air from said air return duct to said conditioned air duct wherein the air pressure in said conditioned air duct is above the air pressure in said air return duct; and means for utilizing heat from the solar collector to warm air passing through said air circulator comprising:

a heat storage chamber;

a first conduit interconnecting the storage chamber and a solar collector inlet;

a second conduit interconnecting a solar collector outlet and the heat storage chamber;

a second fan in the second conduit for translating air from the heat storage chamber to the solar collector and from the solar collector through the second conduit to the heat storage chamber translating solar warmed air to the heat storage chamber; and a third conduit interconnecting the heat storage chamber and the air return duct wherein air flows from the outlet of the solar collector to the heat storage chamber and from the heat storage chamber to the air return duct warming air passing through the air circulator;

a heat pump comprising a condenser disposed within said air return duct, said condenser heating air passing thereby from said air return duct, said heat pump having an evaporator located externally of said building for drawing heat from air passing thereby;

a fan for passing air by said evaporator;

a fourth conduit communicating the heat storage chamber with a first chamber surrounding the evaporator so that solar warmed air may be drawn from the heat storage chamber to warm the air surrounding the evaporator;

a fifth conduit communicating the first chamber with the heat storage chamber to return air from the first chamber to the heat storage chamber when said air has given up its heat; and a third fan means within the fourth conduit for translating solar warmed air to the first chamber and from the first chamber to the heat storage chamber.

3. The solar heater defined in claim 1 wherein said solar heater is associated with a building having a drain tile and means for communicating air through said drain tile to accumulate moisture in said air and connecting said moist air to said solar heat storage chamber.

* * * * *